No. 760,563. PATENTED MAY 24, 1904.
C. REIM.
PROCESS OF EVAPORATING ALKALINE SILICATE SOLUTIONS.
APPLICATION FILED DEC. 24, 1900.
NO MODEL. 2 SHEETS—SHEET 1.
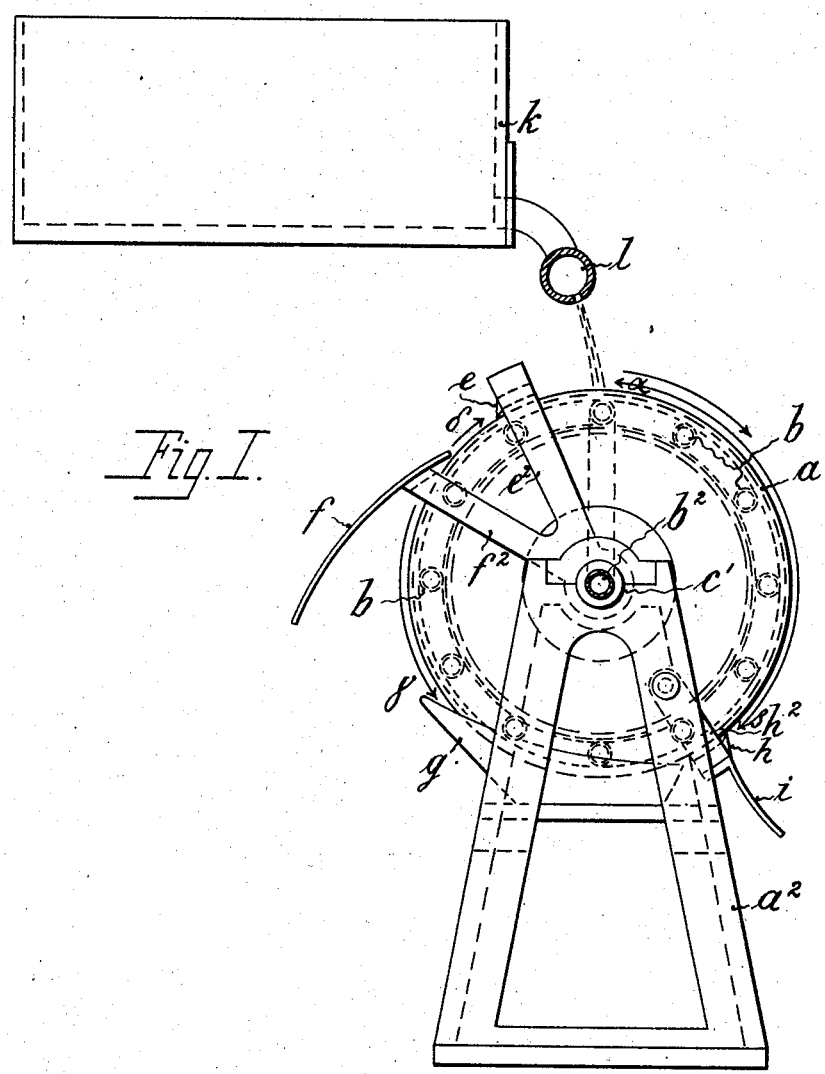
Fig. I.

No. 760,563. PATENTED MAY 24, 1904.
C. REIM.
PROCESS OF EVAPORATING ALKALINE SILICATE SOLUTIONS.
APPLICATION FILED DEC. 24, 1900.
NO MODEL. 2 SHEETS—SHEET 2.
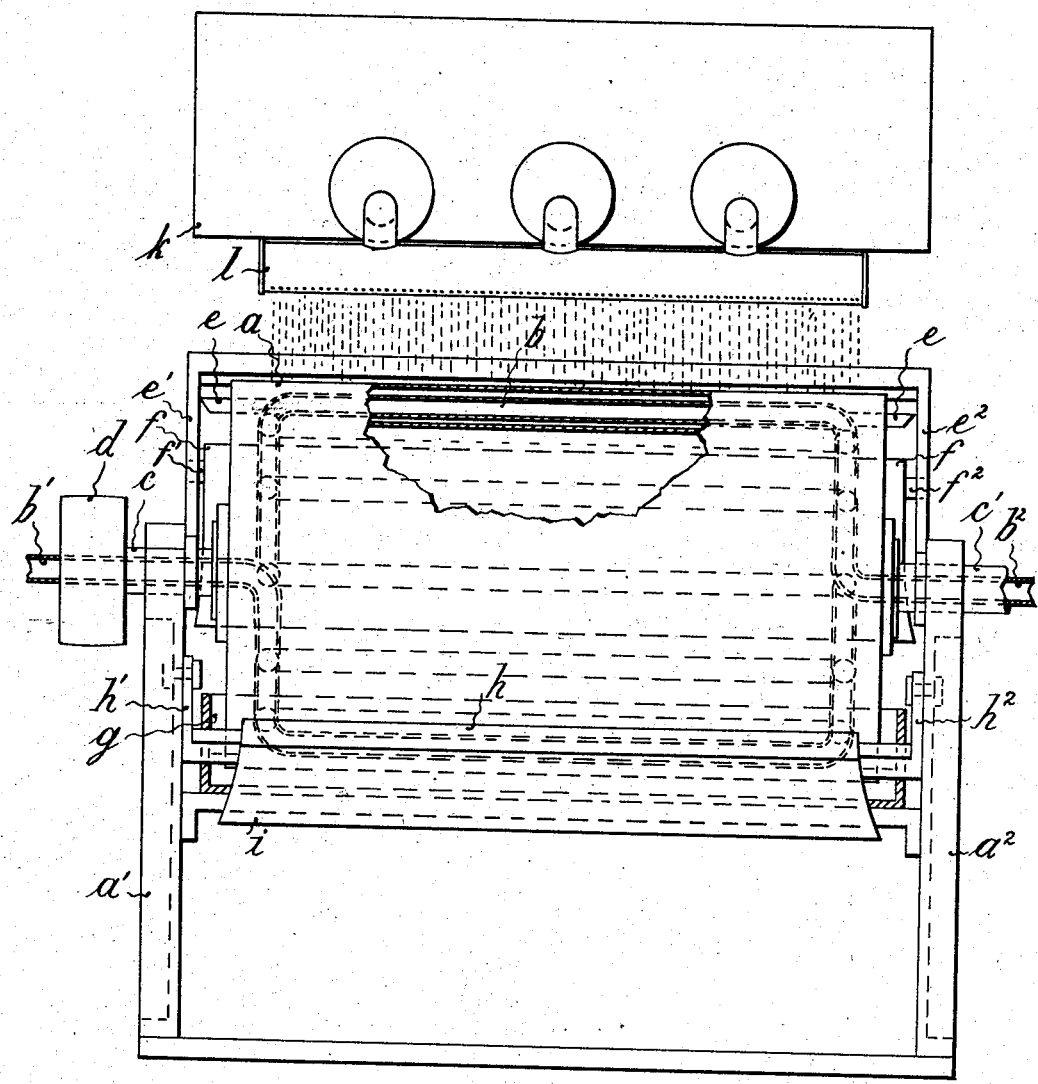
Fig. II.

No. 760,563.

Patented May 24, 1904.

UNITED STATES PATENT OFFICE.

CARL REIM, OF ODESSA, RUSSIA.

PROCESS OF EVAPORATING ALKALINE SILICATE SOLUTIONS.

SPECIFICATION forming part of Letters Patent No. 760,563, dated May 24, 1904.

Application filed December 24, 1900. Serial No. 40,945. (No specimens.)

*To all whom it may concern:*

Be it known that I, CARL REIM, a subject of the Emperor of Germany, residing at Odessa, in the Empire of Russia, have invented certain new and useful Improvements in Processes of Evaporating Alkaline Silicate Solutions, of which the following is a full, clear, and exact description.

In numerous branches of industry, especially in the soap manufacture, silicate of soda or potash is used in the form of a more or less concentrated solution. As is well known silicate of alkali is obtained by melting a certain mixture of raw material and the product is mixed with water and the mixture is brought to a considerably high temperature. The so-obtained solutions of silicate of alkali, which are generally called "solutions of water-glass," require to be transported from the place where they have been produced to the place where they are to be used. Owing to the water contained in a smaller or greater quantity in these solutions of water-glass, they are, however, bulky and heavy and cause considerable costs for packages, freight, custom duties, and other outlays. In order to reduce these expenses, it is necessary to supply the silicate of alkali as free from water as possible to the customers and yet to enable the latter to produce themselves from it the solution fit for their special purpose by simply adding the necessary quantity of water without the use of special apparatus or the addition of any alkalies.

I have discovered that when the solution of silicate of alkali to be found in the trade which is in a pure condition and ready for use is evaporated only to such a point, when the solution is about to change from the liquid to the solid state, care being taken that at this moment the further evaporation of the obtained matter is stopped and the evaporation of the whole contents of water is prevented, a silicate of alkali in a solid condition will be obtained, which can be finely powdered and which is easily soluble in water, especially in cold water. Upon this discovery is based the new process according to my invention.

The solution of silicate of alkali such as may be purchased in the trade, preferably in a pure condition and ready for use, is evaporated on some apparatus of any approved construction. This evaporation is carried on in the manner that the solution is allowed to fall into sprays or jets or thin layers on heated surfaces moving continuously in a direction so that the water of the solution is evaporated, or these surfaces may be arranged for periodical dipping into the solution and taking along with them a film or layer of the solution, which is then evaporated. The size and the speed of the continuously-moving heated surfaces are so determined with regard to their heating power that at the proper moment—*i. e.*, when the spray-drops or the jets or the thin layers of the solution are changed into grains, threads, or leaves, respectively—the obtained matter is taken off the heated surfaces by a scraper or other suitable means, and thus withdrawn from the further action of the heat, after which the matter is allowed to fall into some collecting-reservoir, from whence it is conveyed to some suitable grinding or powdering machine of any approved construction to be turned into a coarse or a fine powder, as the case may be.

The continuously-moving heated surfaces mentioned above have, preferably, the shape of the external surface of a horizontal drum rotated at a slow even speed. The heating of this drum may be effected by steam-pipes arranged on the internal walls of the drum or by any other approved means. A scraper is arranged to bear against the external surface of the drum at a certain distance from the place where the solution commences to be taken along with by the drum. The said scraper is so adjusted that at the very moment when the solution is about to change from the liquid to the solid state it is taken off the drum by the scraper, and thus the action of the heated drum-surface upon the produced matter is stopped.

As equal quantities of the solution are subjected to the same heat and treated during the same space of time and at the same rate of speed, it is evident that the quality of the matter produced will be uniform.

On the accompanying drawings I have shown as an example an apparatus for evaporating the solution of silicate of alkali and for turning it into a silicate of alkali in a solid condition and easily soluble in water.

Figure 1 is a side elevation of the apparatus; and Fig. 2 is a front elevation of the same, partly in section.

Similar letters of reference refer to similar parts in the two views.

$k$ denotes a reservoir into which the solution of silicate of alkali is introduced. To the lowest part of this reservoir is affixed a pipe $l$, provided with a longitudinal row of perforations or a fine slit through which the solution is allowed to fall in a spray, jets, or a thin layer, respectively, on the external surface of the drum $a$.

The drum $a$ is mounted to revolve in the bearings on the standards $a'$ $a^2$. Between the external and the internal mantles of the drum $a$ a heating-coil $b$ is arranged, the windings of which are shown as parallel to the axis of the drum, although they may be equally well placed at right angles thereto. To the coil $b$ the heating-steam is admitted through the inlet $b'$, which is preferably arranged loosely in the hollow trunnion $c$ of the drum. After passing through the windings of the coil $b$ the steam escapes through the outlet $b^2$, which is equally arranged loosely in the hollow trunnion $c'$ of the drum. The rotation of the drum $a$ is effected by means of any suitable driving-gear—for example, by the belt-pulley $d$ shown. To the standards $a'$ $a^2$ a bow $h'$ $h^2$ is affixed, on which a scraper $h$ and a chute $i$ are secured.

The drum $a$ is assumed to be revolving in the direction of the arrow in Fig. 1 and takes along with it the solution-drops, jets, or thin layer, respectively, from the point $\alpha$ to the point $\beta$, where the scraper $h$ bears against the external surface of the drum. As indicated above, the quantity of the solution leaving the perforated or slitted pipe $l$ in the unit of time the distance $\alpha$ $\beta$ and the speed of the drum are so determined with regard to the temperature of the heating-drum surface that the formation of the silicate of alkali in a solid condition occurs just on the place $\beta$, where the silicate is taken off by the scraper $h$, and thus withdrawn from the further action of the heat. The matter scraped off slides down the chute $i$ into some reservoir or hopper or the like, to be thence conveyed to the grinding or powdering machine. In this case only a half of the drum-surface is utilized, which means a loss of heat. Where it is so preferred, also the other half of the drum $a$ may be utilized as follows: To the standards $a'$ $a^2$ another bow $e'$ $e^2$, carrying a scraper $e$, and a third bow $f'$ $f^2$, carrying a chute $f$, are affixed on the upper side. Beneath the drum $a$ a trough $g$ is arranged, into which the solution of silicate of alkali is introduced and where it is kept on a constant level by any known and approved means. The drum $a$ dips so much into the solution as to take along with it a sufficiently-thin layer of the solution from the point $j$ to the point $d$, where the obtained silicate of alkali in a solid condition is taken off the drum by the scraper $e$ and delivered to the chute $f$, from whence it falls off, to be collected and conveyed to the disintegrating-machine. Of course the scraper $e$ requires to be so adjusted as to render the heating power of the drum $a$ equal on both sides.

What I claim as my invention, and desire to secure by Letters Patent, is—

The herein-described method of producing silicate of alkali in a solid but moist condition in which it is easily soluble in water consisting in dividing up the solution of silicate of alkali in the form of drops, jets or the like gathering said drops upon a moving evaporating-mantle and removing the said silicate of alkali at the moment it changes from a liquid to a solid form before the same becomes completely dry, substantially as described.

In witness whereof I have hereunto set my hand in presence of two witnesses.

CARL REIM.

Witnesses:
HENRY HASPER,
WOLDEMAR HAUPT.